United States Patent

[11] 3,629,998

| [72] | Inventor | Masaaki Takehisa |
| | | Takasai-shi, Japan |
| [21] | Appl. No. | 707,856 |
| [22] | Filed | Feb. 23, 1968 |
| [45] | Patented | Dec. 28, 1971 |
| [73] | Assignee | Japan Atomic Research Institute |
| [32] | Priorities | Mar. 2, 1967 |
| [33] | | Japan |
| [31] | | 42/12834; |
| | | Mar. 31, 1967, Japan, No. 42/19972 |

[54] POWDER POLYETHYLENE ADSORBENT
14 Claims, 1 Drawing Fig.

[52] U.S. Cl. .................................................. 55/71,
55/74, 204/159.17, 204/159.2
[51] Int. Cl. ........................................................ B01d 53/04
[50] Field of Search ............................................ 204/159.22,
159.17, 159.2; 260/94.9 F; 55/25–28, 71, 74;
252/426

[56] References Cited
UNITED STATES PATENTS
3,259,609  7/1966  Satake et al. ................  260/94.9 F
3,115,418  12/1963  Magat et al. ................  204/159.17
3,058,899  10/1962  Yanko et al. ................  204/159.22
2,904,480  9/1959  Rainer et al. ................  204/159.2
3,347,841  10/1967  Rademacher ................  260/94.9
3,372,154  3/1968  Turner et al. ................  260/94.9

Primary Examiner—Reuben Friedman
Assistant Examiner—R. W. Burks
Attorney—Waters, Roditi, Schwartz and Nissen ABSTRACT: Powder polyethylene produced by polymerizing ethylene in a gaseous phase or in a liquid phase or a gas-liquid mixed system, where the liquid comprises a solvent or solvents in which the polyethylene does not dissolve, by means of an ionizing radiation or a radical initiator at a temperature lower than the melting point of the polyethylene to be produced has unique surface properties and adsorbs vapors of various organic compounds and volatile fission products. Further, powder polyethylene which has undergone a modification treatment such as cross-linking, graft polymerization or coating of particles with other polymer materials serves similarly as an adsorbent.

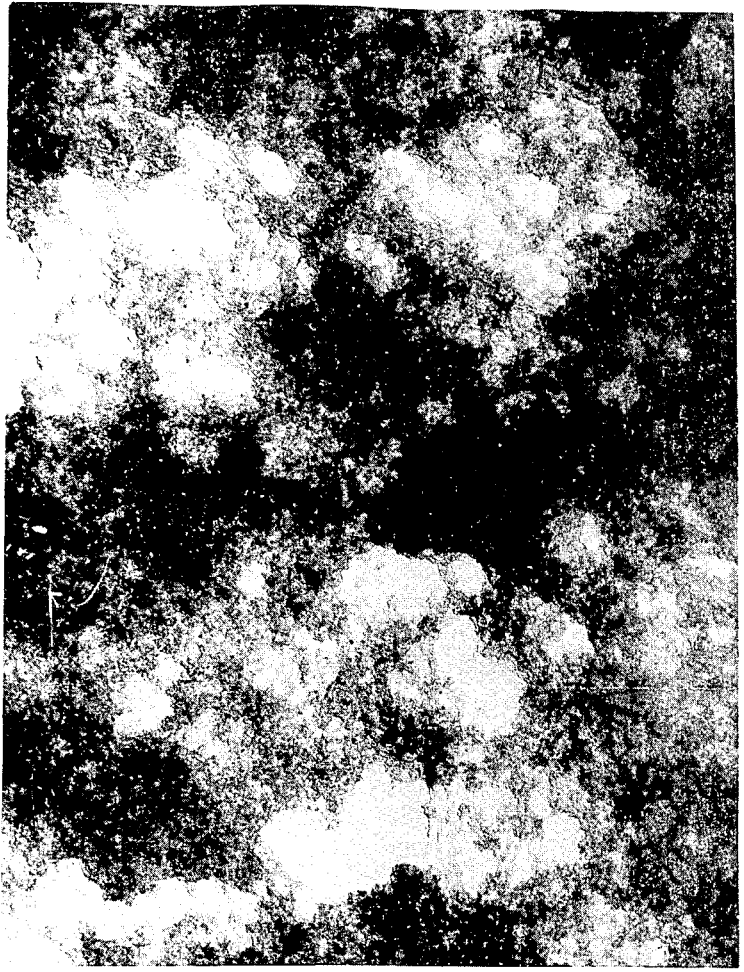

POWDER POLYETHYLENE ADSORBENT

BACKGROUND OF THE INVENTION

In this application, the term "powder polyethylene" is distinguished from "polyethylene powder." In the conventional process, polyethylene powder is manufactured by pulverizing polyethylene produced in lump form by a mechanical or physico-chemical process. However, rather recently it was found that when ethylene is polymerized at a temperature lower than the melting point of the produced polyethylene in a gaseous phase or in a liquid phase or in a gas-liquid mixed system in which the polyethylene does not dissolve by means of an ionizing radiation or a radical initiator, polyethylene is produced in the form of fine powder from the beginning. The term "powder polyethylene" is used to identify the thus-produced polyethylene powder.

I have investigated the physico-chemical properties of the powder polyethylene and have found that its specific surface area ranges between 22 m.$^2$/g. and 134 m.$^2$/g. and it adsorbs vapors of various organic solvents in the same degree as the conventional inorganic adsorbents such as activated carbon, alumina, silica gel, and is especially effective in adsorbing volatile fission products. The same property has been found in the powder polyethylene modified by cross-linking, by graft polymerization of a vinyl compound or by coating the surface of the particles with a polymer material.

Before my invention, no macromolecular organic substance was used as an adsorbent. And the specific surface area of the conventional polyethylene powder was not more than 14 m.$^2$/g. at the greatest.

SUMMARY OF THE INVENTION

The adsorbent of this invention comprises powder polyethylene the specific surface area of which is not less than 22 m.$^2$/g., preferably not less than 30 m.$^2$/g., which is produced by polymerizing ethylene in a system in which the produced polyethylene does not dissolve by means of an ionizing radiation or a radical initiator at a temperature lower than the melting point of the polyethylene to be produced. The adsorbent of this invention is used for adsorbing vapors of various organic solvents and volatile fission products such as radioactive iodine and its organic compounds.

The powder polyethylene which is modified by cross-linking, graft-polymerization or coating particles with a polymer material can also be used for the same purpose. The adsorbent of this invention adsorbs organic vapors selectively and does not exhibit hysteresis in adsorption and desorption.

BRIEF DESCRIPTION OF THE DRAWING

The sole FIGURE of the attached drawing is an electron microphotograph of an embodiment of the adsorbent of this invention.

DETAILED DESCRIPTION OF THE INVENTION

Now the invention will be described in detail by way of examples, said FIGURE of the drawing being referred to.

The adsorbent of this invention, that is, the powder polyethylene, is produced by various processes, in which reaction conditions, such as reaction pressure, dose rate and type of radiation, type and amount of the radical initiator etc. and the molecular weight of the produced polyethylene vary. However, electron microscopic investigation has revealed that a particle of the powder polyethylene that is produced by polymerizing ethylene at a temperature lower than the melting point of the produced polyethylene in a gaseous phase and a liquid phase or gas-liquid mixed system in which the produced polyethylene does not dissolve comprises pluralities of very fine particles which have been formed from the gaseous ethylene or the ethylene solution, and the size of a unit particulet is about 1 micron in size and is invariable no matter how the above-mentioned reaction conditions and the molecular weight of the product vary, as long as the reaction temperature is constant.

The attached microphotograph was taken by an electron microscope at a degree of magnification × 23,000 showing the microstructure of a particle of an adsorbent of this invention (sample A described hereinafter). The microstructure resembles a landscape viewed from an airplane. The part appearing like a hillock or a tree, or like a highlighted pond represents a particulet. The size of the particle ranges from 0.1 to several microns regardless of conditions of polymerization except for temperature, though the size of the whole particle varies in accordance with the conditions.

That is, when polymerization of ethylene is carried out under the above-specified conditions, there is little variation in the adsorbing power of the produced powder polyethylene. This means that the powder polyethylene as the adsorbent can be manufactured either by a batch polymerization or a continuous flow polymerization. However, when the polyethylene is produced by a batch process, it is desirable to employ not as high a conversion, that is, it is recommended to control the conversion at 50 percent or less. When the powder polyethylene is produced by a continuous flow process in which monomeric ethylene is repeatedly circulated in a reaction zone (irradiated zone), it is practically impossible to attain the rate of conversion per pass as high as 50 percent, and therefore there is no need to control the rate of conversion. Also when polymerization is carried out in the presence of a solvent or reaction medium in which polyethylene does not dissolve, there is also no need to control the conversion per pass. The conditions than the conversion may easily be determined by any person skilled in the art.

When the polymerization takes place at temperatures higher than 75° C., there is a tendency for the unit particulet size of the produced polyethylene to become larger, though the particle (agglomerate) recognized by the naked eye becomes smaller, and the surface area per unit mass, that is, specific surface area decreases. This tendency is more remarkable when ethylene is polymerized at a temperature near the melting point of the produced polyethylene. Therefore, the polyethylene to be used for the purpose of this invention must be one that has been produced at a temperature at least lower than the melting point, and preferably lower than 75° C. The polyethylene produced at temperatures lower than the room temperature is not inferior to the one produced at the room temperature in its adsorbing power. However, at such low temperatures, the rate (velocity) of polymerization reaction is lower, and such a reaction condition is not industrially advantageous.

Observation by an electron microscope reveals that the unit particulets constituting a particle or agglomerate do not have a porous structure. This is the reason why the polyethylene of this invention used as an adsorbent exhibits no hysteresis in adsorption and desorption as the conventional adsorbents in which pore condensation takes place, and does not leave residual adsorption which is a deficiency of the conventional adsorbents when adsorption and desorption are repeated, as shown in the following examples.

Use of the powder polyethylene as an adsorbent in this invention is based on adsorption at the surface of the powder polyethylene, and therefore, the absorbent of this invention exhibits selective adsorption of organic substances in preference to water, other inorganic substances and some organic compounds. This is also experimentally established and is shown in example 2.

In the manufacture of the powder polyethylene, adsorbent of this invention, polymerization of ethylene is promoted by means of either an ionizing radiation or a radical initiator. The term ionizing radiation includes corpuscular rays such as alpha rays, neutron beams, beta rays or beams of fission fragments; and high energy electromagnetic waves such as gamma rays or X-rays and it is now an established fact that these radiations have substantially the same effect upon chemical reactions. (For instance, refer to: Chapiro: Radiation Chemistry of Polymeric System, Interscience, 1962; and Charlesby: Atomic Radiation and Polymers, Pergamon Press, 1960.)

In the case in which the powder polyethylene is produced using a radical initiator, it must be one that decomposes at temperature lower than the melting point of the produced polyethylene, but selection of such a radical initiator can be easily made by any person skilled in the art.

When the powder polyethylene is produced in a liquid phase or a gas-liquid mixed system which is formed by addition of a solvent, the solvent must mix with monomeric ethylene at least partially but must not dissolve the produced polymer, and may preferably be recovered as a slurry in which the produced powder polyethylene is dispersed. Some preferred solvents are water, alcohols, and mixtures thereof, and liquefied carbon dioxide.

As the adsorbent of this invention is an organic macromolecular material, it is not proper to carry out desorption at an elevated temperature as is done with the conventional inorganic adsorbent. That is, when the adsorbent of this invention is subjected to repeated adsorption and desorption, it is needless to say that desorption can not be carried out at temperatures higher than the melting point of the polyethylene, but if desorption is carried out at temperatures higher than 50° C., if not higher than its melting point, half-melting (sintering) takes place in the particle per se or between particles and reduction in surface area is induced and this results in a decrease in adsorbing power. Therefore, desorption should be effected not by employing a high temperature but by passing an inert gas or keeping the adsorbent in vacuum. By these means desorption can be easily and rapidly completed, and there is no commercial disadvantage.

However, reduction in adsorbing power of the adsorbent of this invention when adsorption and desorption are repeated can be prevented by applying the known technique of cross-linking by means of an ionizing radiation.

That is to say, by applying the cross-linking treatment by means of an ionizing radiation to the adsorbent of the powder polyethylene, it can be improved in its heat resistance. In this case, alpha rays, beta rays, gamma rays, neutron beams, electron beams, mixed radiations and other accelerated corpuscular rays may be utilized, and selection thereof and determination of radiation conditions can be easily made by any person skilled in the art. Irradiation of the powder polyethylene for the purpose of cross-linking treatment is preferably carried out in vacuum, but it may also be carried out in the air. When the powder polyethylene is irradiated by, say, an electron beam accelerator, the temperature of the irradiated material rises, but heating to a temperature not higher than 75° C. is tolerable. Temperature rise over this range of the target can be easily prevented, for instance, by blowing cold air. Improvement in heat resistance of the polyethylene is shown in example 7.

Further, properties of the powder polyethylene as an adsorbent are improved by graft-polymerizing a vinyl monomer onto it. In grafting a vinyl compound onto the powder polyethylene, polymerization can be started by an ionizing radiation or a radical initiator or any other known means. When an ionizing radiation is employed, either preirradiation or simultaneous irradiation can be utilized. The graft polymerization can be carried out by either soaking the polyethylene powder in a liquid vinyl compound or keeping said polyethylene in contact with a vapor of a vinyl compound. In either case, a solvent in which the produced polyethylene does not dissolve can be used in admixture with the vinyl compound.

The vinyl compounds applicable in the invention include styrene, vinyl acetate, vinyl chloride vinylidene chloride, acrylic acid, methacrylic acid, ethyl acrylate, methyl methacrylate, acrylonitrile, acrylamide, 4-vinyl pyridine, 1,3-butadiene etc., depending upon the end product desired.

In any case, the steps necessary to the graft polymerization must be performed at a temperature lower than the melting point of the polyethylene or the graft polymer, preferably lower than 75° C. The degree of grafting varies depending on the properties of the vinyl monomer to be grafted, and cannot be determined indiscriminately. However, in any case, the degree should be controlled to insure that the great specific surface area which is the characteristic of the powder polyethylene produced by polymerizing under the above-mentioned conditions is not lost, and such degree of grafting can be easily determined by any person skilled in the art.

It is recommended that the graft polymerization be carried out in the gaseous phase because it simplifies the aftertreatment and helps to keep the great specific surface area of the adsorbent.

A modification of the powder polyethylene adsorbent similar to that brought about by graft polymerization can be achieved by covering the surface of the powder polyethylene with a polymer other than polyethylene by dipping said powder polyethylene in a solvent in which said polymer material is dissolved; said solvent wets the surface of said polyethylene but does not dissolve it, so said polyethylene is covered with said polymer.

The polymers which can be applied to the surface of the powder polyethylene include polymers of styrene, vinyl acetate, vinyl chloride, vinylidene chloride, acrylic acid, methacrylic acid, acrylamide, acrylonitrile, 4-vinyl pyridine and 1,3-butadiene, and condensation polymerization products such as polydimethyl siloxisane, polyamide, polyethylene glycol. It is necessary to carry out application of these polymers to the powder polyethylene at a temperature lower than the melting point of the powder polyethylene or preferably lower than 75° C. The amount of the polymers to be applied should be controlled so as to insure that there is no reduction in the great specific surface area which is the characteristic of the powder polyethylene produced by polymerizing ethylene under the above-mentioned conditions. The amount can be easily determined by any person skilled in the art.

EXAMPLE 1 (Samples A–D

The following polyethylene samples were tested.

A. A powder polyethylene prepared by circulating monomeric ethylene at the flow rate of 28 kg./hour through a reaction vessel of 10 liters which was kept at 30° C., and was subjected to gamma radiation from cobalt-60 (100,000 curies) at the dose rate of $3.7 \times 10^5$ rad/hour, ethylene being kept pressurized at 400 kg./cm.$^2$ in the vessel all the time. Its molecular weight is $7 \times 10^4$ and density 0.939 gm./cm.$^3$. Its specific surface area is 101 m.$^2$/g. when measured by the Brunauer-Emette-Teller (BET) method (J. Am. Chem. Soc. 60 309 (1938)). This powder polyethylene is referred to as sample A.

B. A polyethylene prepared by circulating monomeric ethylene at the flow rate 13 kg./hour through a reaction vessel of 10 liters which was kept at 30° C., and was subjected to gamma radiation from cobalt-60 (100,000 curies) at the dose rate of $3.7 \times 10^5$ rad/hour, ethylene being kept pressurized at 225 kg./cm.$^2$ in the reaction vessel all the time. Its molecular weight is $2.8 \times 10^4$ and its density 0.943 gm./cm.$^3$. Its specific surface area is 134 m.$^2$/g. when analyzed by the BET method. This powder polyethylene is referred to as sample B.

C. A powder polyethylene prepared by circulating monomeric ethylene at the flow rate of 13 kg./hour through a reaction vessel of 10 liters which was kept at 75° C., and was subjected to gamma radiation from cobalt-60 (100,000 curies) at the dose rate of $3.7 \times 10^5$ rad/hour, ethylene being kept pressurized at 400 kg./cm.$^2$ in the reaction vessel all the time. Its molecular weight is $2.4 \times 10^4$, and its density 0.933 gm./cm.$^3$. Its specific surface area is 30 m.$^2$/g. when measured by the BET method. This powder polyethylene is referred to as sample C.

D. A powder polyethylene prepared by circulating monomeric ethylene at the flow rate of 13 kg./hour through a reaction vessel of 10 liters which was kept at 90° C., and was subjected to gamma radiation from cobalt-60 (100,000 curies) at the dose rate of $3.7 \times 10^5$ rad/hour, ethylene being kept pressurized at 400 kg./cm.$^2$ in the reaction vessel all the time. Its molecular weight is $1.7 \times 10^4$ and its density 0.932 g./cm.$^3$. Its specific surface area is 22 m.$^2$/g. when measured by the BET method. This powder polyethylene is referred to as sample D. Each of these powder polyethylene was sieved and particles 0.71–0.35 mm. in diameter were collected. About 0.1–0.2 g. of the powder was weighed accurately in a vessel and the vessel was placed in a closed container containing liquid isopropyl alcohol. After the container was kept at 25° C. for 15 hours, the amount of isopropyl alcohol adsorbed on the powder polyethylene in equilibrium with the isopropyl alcohol vapor at 25° C. was measured. At the same time, a commercially available activated carbon for adsorption and a commercially available pulverized polyethylene which was prepared by mechanical pulverization of polyethylene pellets used for molding were subjected to the same test. The specific surface area of said polyethylene powder is 14 m.$^2$/g. by the BET method.

Ease of desorption, which is an important factor of adsorbent material, was also checked, by evacuating the vessel at 25° C. for 0.5 hour.

The test results are shown in table 1.

As these results show, the powder polyethylenes produced by radiation polymerization have sufficient adsorbing power and desorption is easily carried out with them. As has been stated before it is desirable to polymerize ethylene at a temperature lower than 75° C. for this purpose.

Example 2 A–D)

Adsorption capacity and residual adsorption capacity of the powder polyethylenes particles 0.71–0.35 mm. in diameter obtained by sieving the samples A, B, C and D referred to in example 1 were tested with respect to various kinds of compounds at 25° C., in the same way as stated in example 1. The commercially available activated a carbon and the commercially available pulverized polyethylene were also tested for the purpose of comparison. The results are shown in table 2.
Note: Residual adsorption capacity of samples A, B, C and D was 0.5 percent or less in all cases.

Example 3 (Sample E)

A 75 ml. autoclave was charged with ethylene until the internal pressure reached 250 kg./cm.$^2$ at 40° C. The ethylene was polymerized by means of 2,2′-azo-bis-isobutyronitrile for 6 hours at 40° C. A powder polyethylene the molecular weight of which is $29 \times 10^4$ was obtained. This powder polyethylene is referred to as sample E. Its adsorption capacity was measured at 25° C. in the same way as in example 1. The results are shown in table 3.

Table 3

| Vapor (Compound) | Adsorption Capacity (%) |
|---|---|
| Normal heptane | 54.4 |
| Acetone | 35.6 |
| Methyl alcohol | 32.3 |
| Isobutyl acetate | 33.8 |
| Styrene | 27.5 |

Example 4 (Sample F) 3.7×2.0×referred

Ethylene mixed with 24 mole percent of liquefied carbon dioxide (a reaction medium or solvent that does not dissolve polyethylene) and the mixture was circulated through a 10-liter volume reactor that was placed in a zone irradiated with cobalt-60 of 100,000 curies at the flow rate of 17 kg./hour, the inside pressure of the reactor being kept at 400 kg./cm.$^2$ at 20° C. The dose rate was $3.7 \times 10^5$ rad/hour. A powder polyethylene the molecular weight and density of which are respectively $2.0 \times 10^4$ and 0.947 g./cm.$^3$ was obtained. This powder polyethylene is referred to as sample F. Its adsorption capacity was tested in the same way as in example 1. The results are shown in table 4.

Table 4

| Vapor (compound) | Adsorption Capacity (%) |
|---|---|
| Normal heptane | 74.0 |
| Acetone | 59.8 |
| Methyl alcohol | 73.8 |
| Isobutyl acetate | 65.3 |
| Styrene | 27.5 |

TABLE 1

[Adsorption and desorption of isopropyl alcohol by powder polyethylenes produced by radiation polymerization]

| Sample | A | B | C | D | Commercially available Activated carbon | Commercially available Pulverized polyethylene |
|---|---|---|---|---|---|---|
| Amount of adsorbent (grams) | 0.1952 | 0.2223 | 0.1558 | 0.1283 | 0.2324 | 0.4991 |
| Amount of adsorption (grams) | 0.1018 | 0.1088 | 0.0339 | 0.0076 | 0.1344 | 0.0131 |
| Adsorption capacity (percent); $\frac{\text{Amount of adsorption}}{\text{Amount of adsorbent}} \times 100$ | 52.1 | 48.9 | 22.3 | 5.9 | 57.7 | 2.6 |
| Amount of residual adsorption (grams) | 0.0010 | 0.0011 | 0.0006 | 0.0003 | 0.0386 | 0.0008 |
| Capacity of residual adsorption (percent); $\frac{\text{Amount of residual adsorption}}{\text{Amount of absorbent}} \times 100$ | 0.5 | 0.5 | 0.4 | 0.2 | 16.6 | 0.2 |

TABLE 2

| Compound | Vapor pressure (mm. Hg) | Powder polyethylene made by radiation polymerization | | | | Commercially available activated carbon | | Commercially available pulverized polyethylene |
|---|---|---|---|---|---|---|---|---|
| | | A | B | C | D | Absorption | Desorption | |
| Acetone | 220 | 71.5 | 55.2 | 19.7 | | 59.8 | | 1.6 |
| Benzene | 96 | 63.5 | 65.0 | 28.8 | | 61.7 | 22.5 | 6.5 |
| Carbon tetrachloride | 108 | 193.4 | 188.8 | 107.4 | 63.3 | 117.8 | 65.3 | |
| Methyl alcohol | 119 | 88.4 | 85.7 | 34.1 | 8.1 | 57.2 | 6.8 | |
| Methyl ethyl ketone | 100 | 59.3 | 48.8 | 35.5 | 14.6 | 60.5 | 29.5 | |
| Isobutyl acetate | 21 | 59.8 | 70.2 | 20.1 | 11.9 | 62.0 | 31.0 | |
| Styrene | 8 | 30.5 | 29.6 | 14.6 | 11.4 | 62.8 | 35.0 | |
| Normal heptane | 46 | 85.0 | 91.2 | 39.0 | 18.0 | 50.0 | 23.3 | |
| Formic acid | 42 | 4.9 | 7.0 | 1.5 | 1.3 | 86.0 | 20.0 | |
| N,N-dimethyl formamide | 4 | 0.7 | 0.6 | 0.4 | 0 | 60.3 | 39.6 | |
| Dimethyl sulfoxide | | 0.1 | 0.1 | | | 12.1 | | |
| Water | 24 | 0.4 | 0.4 | 0.1 | | 45.3 | | |

Example 5 (Sample G)

A pressure-resistant steel tube 10 mm. in inside diameter, 20 mm. in outside diameter, 90 m. in length was coiled into a helichoid 1 m. in diameter as a pipe reactor. This pipe reactor was 7 liters in volume and cobalt-60 of 100,000 curies was placed at the center of the coil.

Ethylene containing 43.5 percent by weight methyl alcohol in which polyethylene does not dissolve was pressurized at 400 kg./cm.$^2$ and was passed through said reactor at the flow rate of 4.5 m./min. at 20° C. so that it may be subjected to gamma radiation from said cobalt-60 at the dose rate of $2.5 \times 10^5$ rad/hour. A powder polyethylene was produced in the form of a slurry in methyl alcohol, and the produced polyethylene was filtered and dried. Its molecular weight is $2.1 \times 10^4$, and its density 0.955 g./cm.$^3$. This powder polyethylene is referred to as Polyethylene G.

Adsorption capacity of this powder polyethylene was tested at 25° C. in the same way as in example 1. The results are shown in table 5.

Table 5

| Vapor (Compound) | Adsorption Capacity (%) |
|---|---|
| Normal heptane | 49.5 |
| Acetone | 44.9 |
| Methyl alcohol | 40.5 |
| Isopropyl alcohol | 38.9 |
| Isobutyl acetate | 39.6 |
| Styrene | 38.9 |

Example 6 (Sample H)

A 0.5 l autoclave was charged with 100 ml. of a 10 percent by weight aqueous solution of tertiary butyl alcohol, and further with ethylene until the internal pressure reached 400 kg./cm.$^2$ at 30° C. The reaction mixture (an aqueous phase in which a small amount of ethylene is dissolved and a gaseous phase of ethylene and vapors of water and the alcohol) was irradiated with gamma radiation from cobalt-60 of 100,000 curies at the dose rate of $5 \times 10^5$ rad/hour for 20 minutes at 20° C. A powder polyethylene was produced and dispersed in aqueous tertiary butyl alcohol solution. The thus-produced powder polyethylene was filtered and dried. Its molecular weight is $a \times 10^4$ and its density 0.937 g./cm.$^3$. This powder polyethylene is referred to as sample H. Adsorption capacity of this powder polyethylene was tested at 25° C. in the same way as in example 1. The results are shown in table 6.

Table 6

| Vapor (Compound) | Adsorption Capacity (%) |
|---|---|
| Normal heptane | 71.0 |
| Acetone | 47.4 |
| Methyl alcohol | 41.2 |
| Isopropyl alcohol | 42.1 |
| Isobutyl acetate | 39.6 |
| Styrene | 41.4 |

Example 7 (Sample I)

Powder polyethylene A produced by radiation polymerization as explained in example 1, the particle size of which is 0.71–0.35 mm., was irradiated with 2,000,000 electron volt electron beams by means of a resonant transformer type electron accelerator at the dose rate of $20 \times 10^4$ rad/sec. so as to cause cross-linking in the polyethylene. The total dose was 1000 Mrad. This powder polyethylene modified by cross-linking is referred to as sample I. Adsorption capacity of the thus modified powder polyethylene was measured with respect to n-heptane at 25° C. in the same way as in example 1 and was 82.5 percent. Adsorption capacity did not change by cross-linking by irradiation of electron beams. Effect of cross-linking on the heat-resistance of the polyethylene was checked in the same way as in example 1. That is, vapor of n-heptane was absorbed on the modified powder polyethylene, at 25° C., and vacuum desorption was carried out at 25° and 55° C. Adsorption and desorption were repeated and the change in adsorption capacity was checked. It was revealed that cross-linking by irradiation serves to prevent reduction in adsorption capacity. The results are shown in table 7.

TABLE 7

| | Description temperature | | | |
|---|---|---|---|---|
| | 25° C. | | 55° C. | |
| | Adsorption capacity, percent | | | |
| Radiation dose | 0 | 1,000 Mrad | 0 | 1,000 Mrad |
| Repetition of desorption: | | | | |
| 0 | 85.0 | 82.5 | 85.0 | 82.5 |
| 1 | 71.3 | 61.9 | 23.8 | 52.8 |
| 2 | 77.2 | 68.0 | 28.0 | 59.3 |
| 3 | 71.8 | 63.4 | 22.6 | 51.4 |
| 4 | 74.3 | 64.2 | 27.5 | 56.2 |
| 5 | 72.5 | 62.5 | 25.4 | 52.3 |

Example 8 (Sample J)

Sample A was sieved and particles 1–0.71 mm. in diameter were collected. The collected powder was sealed in a thin glass ampul in vacuum, and was irradiated by electron beams of $2.5 \times 10^6$ electron volts from a Cockcraft-Walton type accelerator at the dose rate of $3 \times 10^5$ rad/sec. with the total dose 50 Mrad. After the irradiation, the break-seal of the ampul was broken and styrene vapor was introduced into the ampul at the saturation vapor pressure at 25° C. to be contacted with the preirradiated powder polyethylene for 12 hours by way of effecting graft polymerization. A graft polymer powder in which styrene was grafted to the degree of 32 percent by weight was obtained. It was identified as a graft polymer from the infrared adsorption spectrum of the film made thereof by hot pressing. This graft polymer powder is referred to as sample J.

The adsorbing power of sample J was measured in the same way as in example 1.

Also desorption ability, which is an important property of an adsorbent, was checked in the same way.

The results are shown in table 8.

Table 8

| Compound to be adsorbed | Vapor Pressure mm. Hg | Adsorption Capacity % by weight |
|---|---|---|
| Acetone | 225 | 33.9 |
| Methyl alcohol | 119 | 23.9 |
| Isopropyl alcohol | 43 | 22.1 |
| Isobutyl acetate | 21 | 32.2 |
| Styrene | 8 | 41.4 |
| Normal heptane | 46 | 39.0 |
| Carbon tetrachloride | 108 | 67.0 |
| Water | 24 | 0.7 |

In every case, residual adsorption was less than 0.1 percent by weight. From this table it is evident that the powder polyethylene onto which styrene is graft-polymerized has sufficient adsorbing power for general organic compounds and desorption is easy.

Example 9 (Sample K)

The same powder polyethylene as used in example 8 (sample A) was irradiated by electron beams under the same conditions as in example 8.

The irradiated powder polyethylene was contacted with monomeric vinyl acetate vapor introduced into the ampul through the break-seal at a pressure equivalent to the vapor pressure at 25° C., and thus the gaseous phase graft polymerization was continued for 12 hours at 25° C. A graft polymer powder in which vinyl acetate was grafted to the degree of 77 percent by weight was obtained. The thus obtained powder was ascertained to be a graft polymer by the infrared absorption spectrum of a film of said powder made by hot pressing. This graft polymer powder is referred to as sample K. Adsorption capacity of sample K was measured in the same way as in example 1, and the results are shown in table 9.

Table 9

Adsorption capacity at 25° C. of powder polyethylene onto which vinyl acetate was graft-polymerized.

| Compound to be adsorbed | Vapor Pressure mm. Hg | Adsorption Capacity % by weight |
|---|---|---|
| Acetone | 225 | 40.8 |
| Methyl alcohol | 119 | 27.6 |
| Isopropyl alcohol | 43 | 24.8 |
| Isobutyl acetate | 21 | 30.5 |
| Styrene | 8 | 36.0 |
| Normal heptane | 46 | 27.3 |
| Carbon tetrachloride | 108 | 46.0 |
| Water | 24 | 1.3 |

In every case, residual adsorption was not more than 0.1 percent by weight.

Example 10 (Sample L)

The same polyethylene as used in example 8 (sample A) was irradiated by electron beams under the same conditions as in example 8.

The irradiated powder polyethylene was contacted with monomeric ethyl acrylate vapor introduced into the ampul through the break-seal at the pressure equivalent to the vapor pressure at 25° C., and thus the gaseous phase graft polymerization was continued for 12 hours at 25° C. A graft copolymer powder in which ethyl acrylate was grafted to the degree of 171 percent by weight was obtained. The thus obtained powder was ascertained to be a graft polymer by the infrared absorption spectrum of a film made from said powder by hot pressing. Adsorption capacity of this graft polymer was measured in the same way as in example 1, and the results are shown in table 10.

Table 10

Adsorption capacity at 25° C. of powder polyethylene onto which ethyl acrylate was graft polymerized.

| Compound to be adsorbed | Vapor Pressure mm. Hg | Adsorption Capacity % by weight |
|---|---|---|
| Acetone | 225 | 58.5 |
| Methyl alcohol | 119 | 27.4 |
| Isopropyl alcohol | 43 | 21.4 |
| Isobutyl acetate | 21 | 42.7 |
| Styrene | 8 | 52.3 |
| Normal heptane | 46 | 8.9 |
| Carbon tetrachloride | 108 | 77.5 |
| Water | 24 | 0.6 |

In every case, residual adsorption was not more than 0.1 percent by weight.

Example 11 (Sample M)

Polyethylene glycol dissolves in diethyl ether but polyethylene does not.

The above-mentioned sample B was dipped in a diethyl ether solution of polyethylene glycol, and the power was taken out and the diethyl ether was allowed to vaporize, and further the powder was vacuum-dried. These operations were carried out at 25° C. Thus, polyethylene powder the surface of which was covered by 20 percent by weight of polyethylene glycol was obtained.

The produced polyethylene glycol-coated powder polyethylene is referred to as sample M.

Adsorption capacity of sample M was measured in the same way as in example 1. The results are shown in table 11.

Table 11

Adsorption capacity at 25° C. of organic polymer powder adsorbent produced by covering the surface of the powder polyethylene with polyethylene glycol.

| Compound to be adsorbed | Vapor Pressure mm. Hg | Adsorption Capacity % by weight |
|---|---|---|
| Acetone | 225 | 78.0 |
| Methyl alcohol | 119 | 95.0 |
| Isopropyl alcohol | 43 | 80.7 |
| Isobutyl acetate | 21 | 56.3 |
| Styrene | 8 | 25.8 |
| Normal heptane | 46 | 30.5 |
| Carbon tetrachloride | 108 | 80.0 |
| Water | 24 | 64.6 |

In every case, residual adsorption was not more than 0.1 percent by weight.

From table 11, it is evident that the organic polymer powder adsorbent has sufficient adsorbing power for general organic compounds and desorption is easy.

Example 12 (Sample N)

Polystyrene dissolves in carbon tetrachloride but polyethylene does not.

The powder polyethylene sample A was sieved. Particles 0.71–0.35 mm. in diameter were collected and dipped in a carbon tetrachloride solution of polystyrene and the powder was taken out and the carbon tetrachloride was allowed to vaporize, and further the powder was vacuum-dried. Thus, polyethylene powder the surface of which was covered with 20.4 percent by weight of polystyrene was obtained. These operations were carried out at 25° C. This coated powder polyethylene is referred to as sample N.

Adsorption capacity of sample N was measured in the same way as in example 8. The results are shown in table 8.

Table 12

Adsorption capacity at 25° C. of powder organic polymer adsorbent produced by covering the surface of the powder polyethylene with polystyrene (sample N).

| Compound to be adsorbed | Vapor pressure mm. Hg | Adsorption Capacity % by weight |
|---|---|---|
| Acetone | 225 | 23.5 |
| Methyl alcohol | 119 | 12.0 |
| Isopropyl alcohol | 43 | 13.2 |
| Isobutyl acetate | 21 | 42.1 |
| Styrene | 8 | 38.5 |
| Normal heptane | 46 | 28.5 |
| Carbon tetrachloride | 108 | 86.0 |
| Water | 24 | 0.0 |

In every case, residual adsorption was not more than 0.1 percent by weight.

Example 13 (Samples A – N)

An artificial reactor effluent gas containing 200 microcuries ($\mu$Ci)/liter each of radioactive bromine ($^{82}Br_2$), radioactive iodine ($^{131}I_2$), radioactive krypton ($^{85}Kr$) and radioactive methyl iodine ($CH_3^{131}I$) and the balance being air was prepared. This gas was passed through a glass column packed with the powder polyethylene (each of samples A through N), said column being 3 cm. in inner diameter, 20 cm. in length; and the amount of the packed powder was about 35 g. and particle size thereof was 0.7–1 mm., by urging said gas with a water surface which was raised at the rate of 20 ml. per minute by means of water head. (The surface of the water was covered with liquid paraffin to prevent the radioactive materials from dissolving in the water). A small amount of the gas was taken out through silicone rubber stoppers of sampling ports provided at both ends of the column with a hypodermic syringe and was analyzed by means of radiogaschromatography.

The results are shown in table 9. In the table, retention (%) refers to the radioactivity of the gas after passing the column in proportion to that before passing it multiplied by 100. Error in the value of retention caused by the background, that is, naturally occurring radioactivity was 1-2 percent.

cient to effect polymerization, but being less than that which causes decomposition of the produced polyethylene.

8. A process as claimed in claim 7 in which polymerization is carried out at a temperature lower than 75° C.

9. A process as claimed in claim 1, in which said powder polyethylene is produced by polymerizing ethylene by means of an ionizing radiation or a radical initiator at a temperature lower than the melting point of the produced polyethylene in a liquid phase system or a gas-liquid mixed phase comprising a

| Radioactive ingredients | Adsorbent | | | | | | | | | | | | | | Activated carbon | Wet activated carbon |
|---|---|---|---|---|---|---|---|---|---|---|---|---|---|---|---|---|
| | A | B | C | D | E | F | G | H | I | J | K | L | M | N | | |
| Br {Before adsorption (μCi/l) | 255 | 231 | 212 | 194 | 173 | 157 | 241 | 215 | 191 | 259 | 231 | 205 | 182 | 161 | 168 | 151 |
| After adsorption (μCi/l) | 5 | 7 | 4 | 2 | 19 | 6 | 29 | 15 | 6 | 2 | 9 | 6 | 2 | 1 | 3 | 137 |
| Retention (percent) | 2 | 3 | 2 | 1 | 11 | 4 | 12 | 7 | 3 | <1 | 4 | 3 | 1 | <1 | 2 | 91 |
| I {Before adsorption (μCi/l) | 194 | 191 | 191 | 190 | 190 | 190 | 204 | 200 | 199 | 205 | 201 | 200 | 198 | 198 | 199 | 199 |
| After adsorption (μCi/l) | 6 | 7.5 | 6 | 4 | 25 | 9.5 | 30 | 20 | 4 | 3 | 10 | 8 | 1.7 | 1.4 | 6 | 175 |
| Retention (percent) | 3 | 4 | 3 | 2 | 13 | 5 | 15 | 10 | 2 | 1.5 | 5 | 4 | <1 | <1 | 3 | 88 |
| Kr {Before adsorption (μCi/l) | 204 | 204 | 204 | 203 | 203 | 203 | 201 | 201 | 201 | 200 | 201 | 200 | 199 | 199 | 200 | 201 |
| After adsorption (μCi/l) | 88 | 98 | 84 | 79 | 116 | 104 | 119 | 123 | 91 | 78 | 126 | 136 | 146 | 144 | 191 | 201 |
| Retention (percent) | 43 | 48 | 41 | 39 | 57 | 51 | 59 | 61 | 45 | 39 | 63 | 68 | 73 | 72 | 96 | 190 |
| $CH_3I$ {Before adsorption (μCi/l) | 231 | 225 | 223 | 220 | 219 | 217 | 211 | 204 | 203 | 209 | 204 | 202 | 200 | 198 | 202 | 200 |
| After adsorption (μCi/l) | 2 | 4.5 | 2 | 2 | 13 | 6.5 | 17 | 22 | 4 | 9.4 | 16 | 24 | 6 | 10 | 4 | 170 |
| Retention (percent) | 1 | 2 | 1 | 1 | 6 | 3 | 8 | 11 | 2 | 4.5 | 8 | 12 | 3 | 5 | 2 | 85 |

What I claim is:

1. A process for adsorbing a gas in which hysteresis in adsorption and desorption is improved, said process comprising contacting a gas selected from the group consisting of vapors of an organic compound and a gas of a volatile radioactive substance with a powder polyethylene having a specific surface area of not less than 22 m.²/g.

2. A process as claimed in claim 1, in which the specific surface area of said powder polyethylene is not less than 30 m.²/g.

3. A process as claimed in claim 1, in which said organic compound is a nonpolar organic compound.

4. A process as claimed in claim 3, in which said nonpolar organic compound is selected from the group consisting of acetone, benzene, carbon tetrachloride, methyl alcohol, methyl ethyl ketone, isobutyl acetate, styrene and normal heptane.

5. A process as claimed in claim 1, in which said volatile radioactive substance is selected from the group consisting of radioactive bromine, iodine, krypton and methyl iodide.

6. A process as claimed in claim 1, in which said gas is contacted with said powder polyethylene through a column packed with said powder polyethylene.

7. A process as claimed in claim 1, in which said powder polyethylene is produced by polymerizing ethylene by means of an ionizing radiation or a radical initiator at a temperature lower than the melting point of the produced polyethylene in a gaseous phase or a liquid phase or a gas-liquid mixed phase, the dose of radiation or the amount of the initiator being suffipolymerization medium in which the produced polyethylene does not dissolve, the dose of radiation or amount of initiator being sufficient to effect polymerization, but being less than that which causes decomposition of the produced polyethylene.

10. A process as claimed in claim 9, in which polymerization is carried out at a temperature lower than 75° C.

11. A process as claimed in claim 1, in which the powder polyethylene is cross-linked powder polyethylene and further comprising irradiating said powder polyethylene with an ionizing radiation, the dose of radiation being sufficient to effect cross-linking but less than that which causes substantial decomposition of the powder polyethylene.

12. A process as specified in claim 10, in which the radiation dose is from 50 Mrad to 1,000 Mrad.

13. A process as claimed in claim 1, in which, said powder polyethylene is graft-polymerized with a vinyl monomer selected from the group consisting of styrene, vinyl acetate, vinyl chloride, vinylidene chloride, acrylic acid, methacrylic acid, ethyl acrylate, methyl methacrylate, acrylonitrile, acrylamide, 4-vinyl pyridine and 1,3-butadiene.

14. A process as specified in claim 1, in which said powder polyethylene is coated with a polymer material selected from the group consisting of polymers of styrene, vinyl acetate, vinyl chloride, vinylidene chloride, acrylic acid, methacrylic acid, acrylamide, acrylonitrile, 4-vinyl pyridine and 1,3-butadiene, and condensation polymerization products of polydimethyl siloxisane, polyamide and polyethylene glycol.

* * * * *